(12) United States Patent
Cros

(10) Patent No.: US 8,907,837 B1
(45) Date of Patent: Dec. 9, 2014

(54) DEVICE FOR CONTROLLING THE DISPLAY OF A WEATHER RADAR IMAGE ON BOARD AN AIRCRAFT

(75) Inventor: Xavier Cros, Daux (FR)

(73) Assignee: Airbus Operations, Toulouse (FR)

( * ) Notice: Subject to any disclaimer, the term of this patent is extended or adjusted under 35 U.S.C. 154(b) by 875 days.

(21) Appl. No.: 13/110,623

(22) Filed: May 18, 2011

(30) Foreign Application Priority Data

May 25, 2010 (FR) ...................... 10 54030

(51) Int. Cl.
*G01S 13/95* (2006.01)
(52) U.S. Cl.
USPC ........................................ 342/26 B
(58) Field of Classification Search
CPC ......... G01S 13/953; G01S 7/064; G01S 7/12; G01W 1/02; G08G 5/0021; G08G 5/0091
USPC ............................. 342/26 R, 26 B
See application file for complete search history.

(56) References Cited

U.S. PATENT DOCUMENTS

| | | | |
|---|---|---|---|
| 5,602,543 A * | 2/1997 | Prata et al. | 340/968 |
| 7,081,834 B2 * | 7/2006 | Ruokangas et al. | 340/945 |
| 7,372,394 B1 | 5/2008 | Woodell et al. | |
| 7,411,519 B1 | 8/2008 | Kuntman et al. | |
| 8,159,369 B1 * | 4/2012 | Koenigs et al. | 340/963 |
| 8,825,238 B2 * | 9/2014 | Peptione et al. | 701/16 |

FOREIGN PATENT DOCUMENTS

| | | | |
|---|---|---|---|
| EP | 1 944 621 A1 | 7/2008 | |
| EP | 2138864 A1 * | 12/2009 | G01S 7/06 |
| EP | 1852683 B1 * | 6/2014 | |

OTHER PUBLICATIONS

Lemos, K.; Chamberlain, J., "In-flight weather trending information: optimal looping characteristics for animated NEXRAD images," Digital Systems Conference, 2004. DASC 04. The 23rd , vol. 1 no., pp. 51-12 vol. 1, Oct. 24-28, 2004.*

Chamberlain, J.; Lemos, K., "Design considerations for presenting data-linked animated radar imagery on in-flight displays," Digital Avionics Systems Conference, 2004. DASC 04. The 23rd , vol. 1, no., pp. 51-12 vol. 1, Oct. 24-28, 2004.*

Preliminary Search Report dated Jan. 26, 2011 issued in French Patent Application No. 1054030 (with translation).

* cited by examiner

*Primary Examiner* — John B Sotomayor
(74) *Attorney, Agent, or Firm* — Oliff PLC

(57) ABSTRACT

The device for controlling the display of a radar image on board an aircraft, in particular a weather radar image, is suitable for performing at least one predetermined test on a radar echo in order to decide on a representation corresponding to the echo in a radar image display.

16 Claims, 2 Drawing Sheets

DEVICE FOR CONTROLLING THE DISPLAY OF A WEATHER RADAR IMAGE ON BOARD AN AIRCRAFT

This application claims priority from French Patent Application No. 1054030, filed May 25, 2010, which is incorporated herein by reference in its entirety.

FIELD OF THE INVENTION

The invention relates to aircraft radars, in particular weather radars.

BACKGROUND OF THE INVENTION

The pilots of civil and military airplanes have a screen available on board in the cockpit, which screen is connected to an on-board radar for displaying a representation of the weather situation in front of the airplane. The radar operates by transmitting a radiowave signal in front of the airplane. When that signal meets an obstacle such as droplets of water in suspension in the atmosphere, it is reflected back to the airplane and received by the radar. By measuring the time between the transmission of the signal and the reception of the echo, it is possible to determine the time taken by the echo to reach the antenna of the airplane and thus the distance to the obstacle forming the source of the echo. Furthermore, by measuring the intensity of the reflected signal, the radar determines the density and the size of the droplets.

A difficulty arises when another aircraft lies in the field of coverage of the radar. That other aircraft, referred to herein as an "intruder" (without any associated notion of hostility) also constitutes an obstacle that reflects the radar signal back to the airplane that transmitted it. Such a radar echo is then detected by the on-board weather radar and it is displayed on the screen as though it were a cloud. That phenomenon occurs even when the intruder is at a range of several tens of nautical miles from the radar. Furthermore, that phenomenon is particularly visible on the screen when flying in good weather. It gives rise to a spot on the screen that looks like a small cloud at the location of the intruder, even though there is not a cloud in the sky. That defect requires the crew of the airplane either to interpret the anomaly as being an anomaly by performing verifications, or else to believe that the representation the radar screen does indeed correspond to a cloud and thus to be wrongly informed about the nature of the obstacle and the danger that it might represent.

OBJECT AND SUMMARY OF THE INVENTION

An object of the invention is thus to improve the reliability of the images provided by an aircraft radar.

To this end, the invention provides a device for controlling the display of a radar image on board an aircraft, in particular a weather radar image, the device being suitable for performing at least one predetermined test on a radar echo in order to decide on a choice of a representation corresponding to the echo in a radar image display.

Thus, the test is performed upstream from the display of the radar image on the screen, thereby making it possible to control the display as a function of the result of the test and thus to provide information that is more reliable concerning the presence, where appropriate, and the nature of an obstacle situated in front of the airplane.

Preferably, the device is suitable for determining whether a speed of a source of the echo exceeds a predetermined threshold.

This type of test makes it possible, with a good degree of reliability, to decide whether the source of the radar echo is or is not an aircraft.

Preferably, the device is suitable for determining whether a distance between a location of a source of the echo and a location of another aircraft exceeds a predetermined threshold.

Thus, if the distance is less than the threshold, it is assumed that the echo was produced at least in part by the aircraft. This type of test is made possible for example by the fact that the aircraft receives data from a transponder of another aircraft. It is then advantageous for the aircraft to include means for processing transponder data for this purpose.

Preferably, the device is suitable for determining whether a dimension corresponding specifically to a source of the echo exceeds a predetermined threshold.

Thus, this other type of test also serves, with a good degree of reliability, to decide whether the obstacle constituting the source of the radar echo does or does not correspond to an aircraft.

Preferably, the device is suitable for controlling the display so that it appears without a representation corresponding to the echo.

This could apply when the test leads to it being considered that the echo comes from an aircraft.

Advantageously, the device is suitable for controlling the display so as to associate a predetermined symbol with the echo.

This symbol thus informs the pilot about the assumed nature of the echo source as a function of the result of the test.

Advantageously, the device is suitable for determining whether at least one zone contiguous with the zone from which the echo comes is associated with another echo.

Preferably, the device is suitable for causing the image to be displayed in a first zone from which the echo comes, with a representation that results from an echo coming from at least one second zone that is contiguous with the first zone.

It is possible that the received radar echo is caused both by another aircraft and by a cloud mass in which that aircraft is located. It is then necessary to avoid the elimination of the representation that corresponds to the aircraft in the image also leading to the image having eliminated therefrom any representation associated with the cloud mass, it being understood that it is important for the members of the crew to be informed about the presence of the cloud. That is why it is detected whether a cloud mass is also present in a zone that is contiguous to the zone in which the aircraft has been located. It is then possible to decide to represent the cloud mass as existing also at the location where the aircraft was detected. Under certain circumstances, this can avoid causing a black hole to appear in the representation of the cloud mass on the radar screen.

Provision may also be made for the device of the invention to be suitable for executing at least one of the following steps:
- determining whether the speed of an echo source exceeds a predetermined threshold;
- determining whether a distance between a location of a source of the echo and a location of another aircraft exceeds a predetermined threshold; and
- determining whether a dimension corresponding specifically to a source of the echo exceeds a predetermined threshold.

The invention also provides an aircraft including a device of the invention.

The invention also provides a method of controlling a display of a radar image on board an aircraft, in particular a weather radar image, in which method automatic means perform at least one predetermined test on a radar echo in order to decide on a choice of a representation corresponding to the echo in an image display.

The invention also provides a computer program including code instructions suitable for controlling the execution of a method of the invention when executed on a computer.

The invention also provides a data recording medium including such a program in recorded form.

Finally, the invention provides making such a program available on a telecommunications network for downloading purposes.

BRIEF DESCRIPTION OF THE DRAWINGS

Other characteristics and advantages of the invention appear further from the following description of elements given as non-limiting examples with reference to the accompanying drawings, in which.

MORE DETAILED DESCRIPTION

Figure 1:
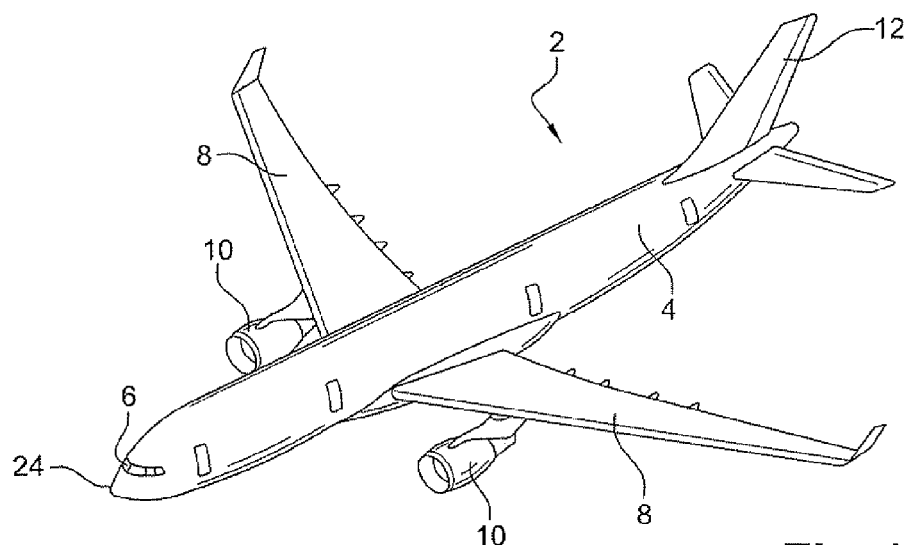
FIG. 1 is a perspective view of an aircraft of the invention.

FIG. 1 shows an aircraft 2 of the invention that, in this example, forms an aerodyne, and specifically an airplane. The airplane has a fuselage 4 with a cockpit 6 at its front end that is occupied by one or more crew members. The airplane has two wings 8 fastened to the fuselage. It also has two engines 10 that propel the airplane in flight and that are fastened to respective ones of the wings 8. The number and the locations of the engines 10 are not limiting. The airplane, includes a tail fin 12. Specifically the airplane is an airliner for transporting passengers and/or freight and it is suitable for conveying at least one person such as a crew member.

The airplane 2 has numerous on-board systems and other pieces of equipment, including a radar 14, which specifically is a weather radar suitable for identifying precipitation (rain, snow, hail, etc.), for calculating the movement of the precipitation, and for determining its type.

The radar 14 includes a computer 16 and a memory member 18 storing data such as meteorological data, as explained below.

Figure 3:
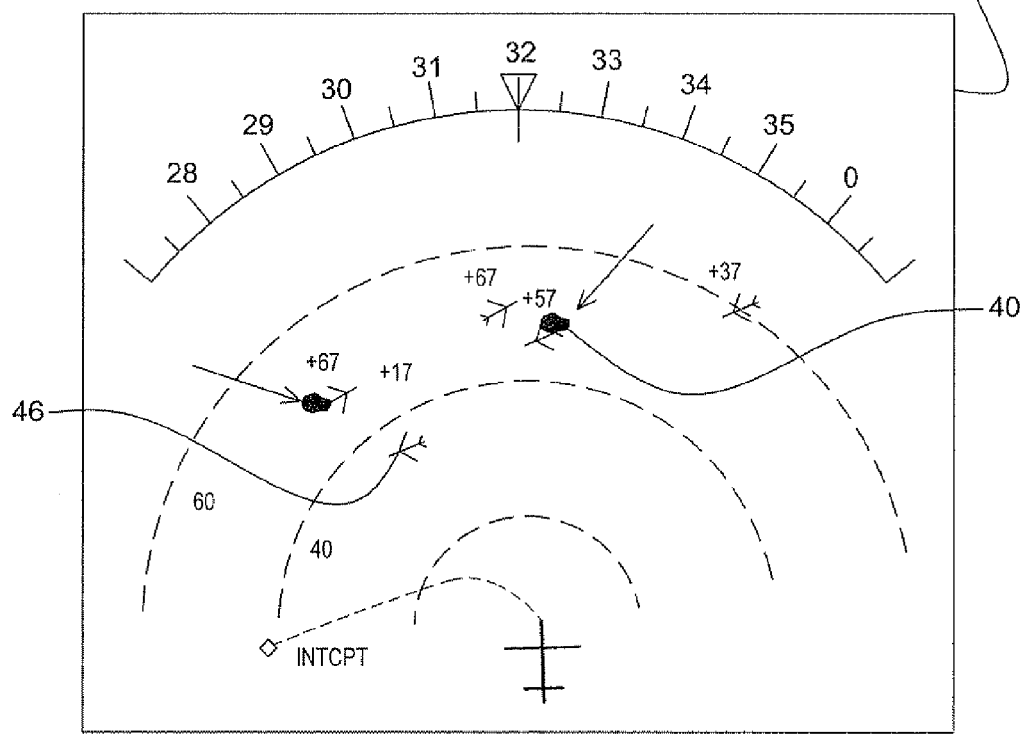
FIG. 3 is a view on a larger scale of the radar image delivered by the FIG. 2 radar.

The cockpit 6 includes at least one monitor having a screen 20 serving to display a radar image as shown in detail in FIG. 3.

The radar 14 has means 22 such as an antenna for transmitting electromagnetic waves and for receiving them for processing by the computer 16. The antenna 22 is located for example in the nose 24 of the airplane, situated at the front end of the fuselage. It could be situated at some other location, for example close to a wing 8.

Figure 2:
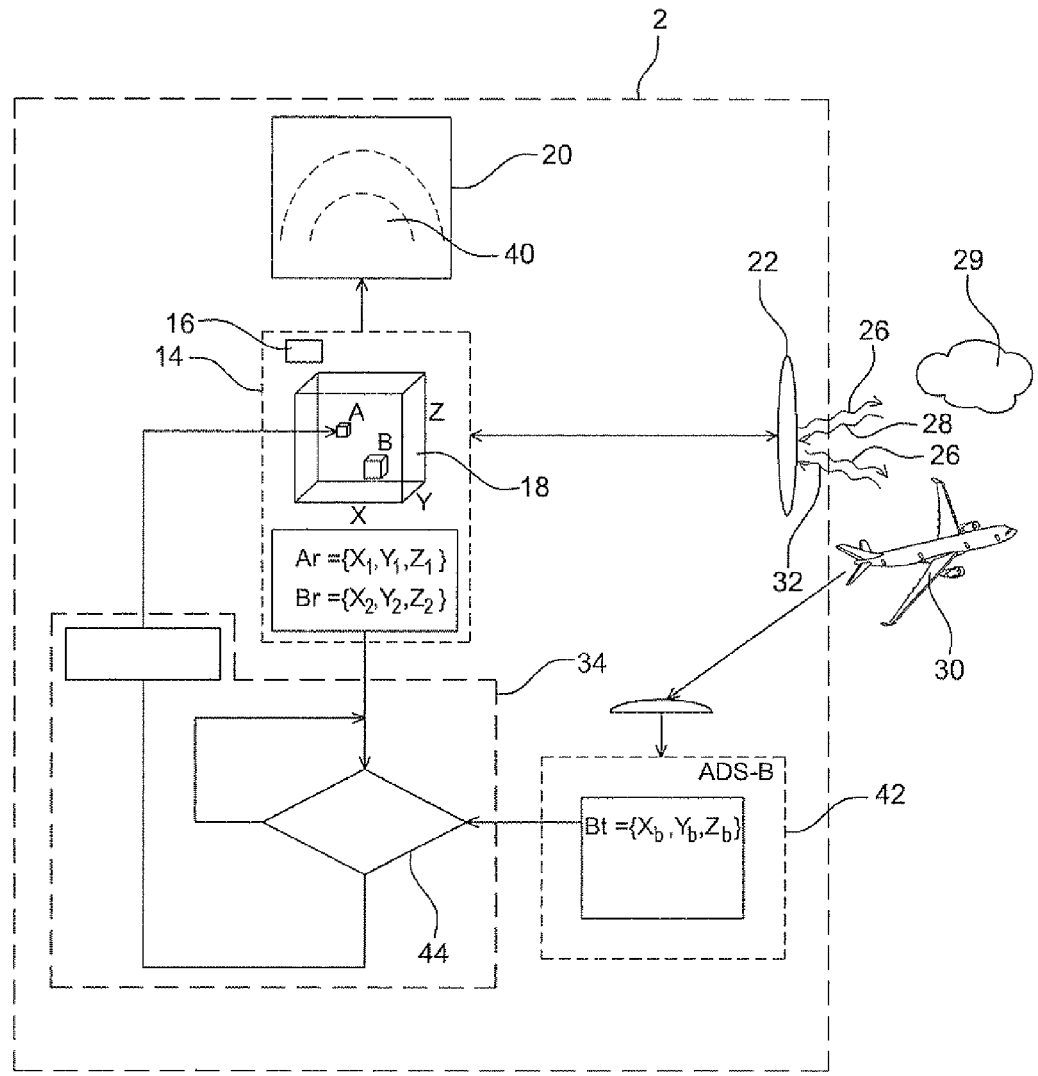
FIG. 2 is a diagrammatic view of the radar of the FIG. 1 aircraft and of other elements in its environment.

The computer 16 is arranged to transmit a signal forwards from the airplane, this transmission being represented in FIG. 2 by arrow 26. If the signal meets an obstacle such as a rain cloud 29, its droplets reflect a fraction of the transmitted signal 26 such that an echo 28 reaches the antenna 22 and is detected by the computer 16. A similar phenomenon occurs if the transmitted wave 26 encounters an aircraft constituting an intruder 30. This results in an echo 32 returning to the radar 14.

The airplane 2 includes a computer 34 that assists the radar in displaying images on the screen 20, and that controls the display on behalf of the radar.

Various implementations of the method of the invention are described below. The elements described above are suitable for executing all or some of the steps described below, or for causing them to be executed.

First Implementation

It is assumed below that the radar transmits a radar signal 26 and then receives an echo 28, 32 resulting from the signal being reflected on an obstacle, and that the radar 14 does not have any a priori knowledge about the nature of that obstacle.

On receiving the echo 28, 32, the computer 34 analyses the data contained in the echo to determine whether it is a radar echo caused by another aircraft 30. To do this, it performs a predetermined test on the echo in order to decide whether the computer is to cause the screen 20 to display an image without any representation corresponding to said echo.

Specifically, the computer 34 determines a travel speed of an echo source. To do this, it consults meteorological data obtained at various instants in the past by the radar 14 and stored in its memory 18. This data includes in particular data concerning the three-dimensional locations ahead of the airplane of various sources that have previously generated echoes. Using this location data and knowledge at the times to which said data corresponds, the computer 34 calculates an estimated value for a speed of the source that reflected the echo 28, 32.

A speed threshold is predetermined that makes it possible, with a high degree of reliability, to distinguish between echoes associated with an aircraft 30 and echoes associated with a meteorological phenomenon 29. By way of example, the speed threshold may be selected to represent a wind speed, in particular in a predetermined zone and/or altitude. For example, the threshold may be set at 150 kilometers per hour (km/h) or 175 km/h.

In step 44, if the speed estimated by the computer 34 is less than or equal to the threshold, the computer decides that it will cause an image to be displayed that includes a representation 40 corresponding to the echo. It is then considered that the source of the echo is a cloud 29. The radar then represents the echo as such, e.g. by means of a spot of color 40.

On the contrary, if the estimated speed exceeds the predetermined threshold, the computer 34 decides to cause the radar image to be displayed on the screen 20 without including therein a representation that corresponds to the echo. It is then considered that the source of the echo is an aircraft 30. Thus, if it is decided that certain information corresponds to a radar echo from another airplane, that information is not displayed on the radar screen.

Second Implementation

There follows a description of another implementation of the method of the invention.

The airplane now further includes a transponder system 42. By way of example, it may be an automatic dependent surveillance-broadcast (ADS-B) type system that is a co-operative surveillance system. An aircraft fitted with an ADS-B determines its position by a satellite positioning system and it periodically sends that position together with other information to ground stations and to nearby aircraft fitted with ADS-B. A fitted airplane thus also receives radio transmissions that result from radio signals being transmitted by other aircraft located in the surroundings of the airplane. These signals include data about the instantaneous positions of those aircraft. Such a position is typically represented by three coordinates X, Y, and Z, associated with three directions in space in an orthogonal frame of reference. In FIG. 2, the aircraft 30 has thus transmitted to the transponder 42 of the airplane 2 the coordinates $X_b$, $Y_b$, and $Z_b$ of its instantaneous position.

When implementing the method, during a test 44, the computer 34 begins by determining whether a dimension corresponding specifically to the echo source 28, 32 exceeds a predetermined threshold. For example, the threshold may be set at one kilometer, given that the aircraft presently in service presents a maximum dimension that is less than that threshold. An estimated value for the greatest dimension of the source is calculated on the basis of the data relating to the echo itself.

At step 44, if the estimated greatest dimension of the source exceeds the threshold, then the computer 34 assumes that the source of the echo is an obstacle 29 other than an aircraft. It then causes the radar image to be displayed with a representation 40 of the obstacle, e.g. in the form of a spot.

Otherwise, with the estimated greatest dimension being below the threshold, the computer 34 performs a second test. This test seeks to evaluate whether the location of the echo source corresponds substantially to the location of another aircraft. To do this, the computer 34 searches the data in its memory coming from the transponder 42 for data concerning aircraft situated close to the zone from which the echo comes. It compares the respective coordinates thereof, e.g. $X_b, Y_b, Z_b$ with $X_c, Y_c, Z_c$ for two such aircraft with the coordinates $X_1, Y_1, Z_1$ of the zone from which the echo comes in order to identify which aircraft is closest to the zone in which the source of the echo 28, 32 is situated. It calculates the distance between the location of that aircraft and the location of the echo source. It then compares that distance with a predetermined threshold. By way of example, a threshold of two kilometers may be selected if the above-mentioned value of one kilometer was used as the dimension threshold.

If the distance is greater than the threshold, the computer assumes that the source of the echo is not one of the identified aircraft. It therefore considers that the source is a meteorological phenomenon and causes the radar image to be displayed including a representation of the echo, e.g. in the form of a spot.

On the contrary, if the distance is less than the threshold, the computer assumes that it is the closest aircraft 30 that constitutes the source of the radar echo. The computer then causes the image to be displayed without the representation 40 associated with that echo.

First Variant

In each of the implementations, it is possible in a variant, when an echo is identified as coming from an aircraft, to make provision not to omit any representation 40 of said echo on the radar image 20, but rather to represent the echo by means of a symbol 46 indicating that it is an obstacle of a non-meteorological kind. It is thus possible to represent it by means of an icon or a symbol that looks like an aircraft.

Second Variant

A difficulty may arise if the computer 34 acting in that way determines that there is an intruder in the form of an aircraft present within a cloud mass. Under such circumstances, the above-described implementations could lead to the image of said mass appearing with a black hole at the assumed location of the aircraft, since the aircraft is not associated with a representation in the image. Such an image is then an erroneous representation of the meteorological situation. That is why the following variant is provided.

It is assumed that the computer 34 has identified an echo source as being associated with an aircraft.

The computer 34 then determines whether at least one second zone contiguous with the zone from which the echo comes is itself associated with a second echo that is different from the first echo. The prior distinction between the zones in question may be performed arbitrarily in the form of volumes subdividing a fraction of the space situated ahead of the airplane and associated with a radar image.

If at least one second zone contiguous with the zone of the first echo is indeed associated with a second echo, the computer 34 causes the image to be displayed on the screen 20 in such a manner that the location of the first zone presents a representation that does not correspond to the first echo but to the result of detecting a second echo in the contiguous zone. For example, the representation may be one that is associated with a cloud if a cloud has also been detected in the second zone. The pilot thus sees on the screen a cloud mass covering both zones.

Provision may also be made for the zone associated with the first echo to be filled in with a representation in this way only if at least two or even three zones contiguous with that zone are themselves associated with other echoes.

In other words, if the intruder is located in an extended cloud mass from which the return signals are of the same or similar intensities, care is taken not to spoil the rendering of the meteorological image in which the intruder is to be found, in particular care is taken to avoid causing a "black hole" to appear in the representation of the cloud mass on the screen 20. The zones adjacent to the intruder are thus analyzed in order to determine whether the intruder is or is not included in a cloud. This analysis is advantageously performed by consulting the data that appears in the memories 18.

In each of these implementations and in each of these variants, the radar 16 and the computer 34 are provided with one or more microprocessors, clocks, memories, and means adapted to transmitting and receiving signals, in particular control signals in order to implement the above-described steps.

All or some of the above-described steps may be executed or controlled by the radar 16 and the computers 34, 36 by means of at least one program recorded on a data recording medium and including code instructions suitable for controlling the execution of said steps when executed on a computer. Such a program may be made available on a telecommunications network, in particular in order to be downloaded.

Naturally, numerous modifications may be applied to the invention without going beyond its ambit.

The invention is applicable to types of radar other than weather radars.

The above-described implementations and variants may be combined with one another.

The invention claimed is:

1. A system for controlling the display of a radar image on board an aircraft, the system comprising:
   a radar that receives a radar echo;
   an image display device that displays the radar image, wherein the radar image comprises a weather radar image;
   a controller that is in operative communication with the radar and the image display device and that is configured to:
      perform at least one predetermined test on the data including any one or more of:
         determining whether a speed of a source of the radar echo exceeds a predetermined threshold;
         determining whether a distance between a location of the source of the echo and a location of another aircraft exceeds a predetermined threshold; and
         determining whether a dimension corresponding specifically to the source of the echo exceeds a predetermined threshold;
      decide whether to display via the image display device a representation of the radar echo; and select the representation of the radar echo from a plurality of predetermined representations based on a result of the at least one predetermined test.

2. The system according to claim 1, wherein the controller is configured to control the image display device so that it appears without a representation corresponding to the radar echo.

3. The system according to claim 1, wherein the controller is configured to control the display so as to associate a predetermined symbol with the radar echo.

4. The system according to claim 1, wherein the controller is configured to determine whether at least one zone contiguous with a zone from which the radar echo comes is associated with another echo.

5. The system according to claim 1, wherein the controller is configured to cause the radar image to be displayed in a first zone from which the radar echo comes, with a representation that results from another echo coming from at least one second zone that is contiguous with the first zone.

6. The method according to claim 1, wherein the source of the radar echo is a phenomenon other than a meteorological phenomenon.

7. A method of controlling a display of a radar image on board an aircraft, the radar image comprising a weather radar image, the method comprising:
   in response to receiving data associated with a radar echo, automatically performing, using a controller, at least one predetermined test on the data including any one or more of:
      determining whether a speed of a source of the radar echo exceeds a predetermined threshold;
      determining whether a distance between a location of the source of the radar echo and a location of another aircraft exceeds a predetermined threshold; and
      determining whether a dimension corresponding specifically to the source of the radar echo exceeds a predetermined threshold;
   deciding, using the controller, whether to display via an image display device a representation of the radar echo; and
   selecting the representation of the radar echo from a plurality of predetermined representations based on a result of the at least one predetermined test.

8. The method according to claim 7, further comprising:
   controlling the image display device so that it appears without a representation corresponding to the radar echo.

9. The method according to claim 7, further comprising:
   displaying via the image display device a predetermined symbol representing the radar echo.

10. The method according to claim 7, further comprising:
    determining whether at least one zone contiguous with a zone from which the echo comes is associated with another echo.

11. The method according to claim 7, wherein the radar image is displayed, via the image display device, in a first zone from which the radar echo comes, with a representation that results from another echo coming from at least one second zone that is contiguous with the first zone.

12. A non-transitory computer-readable medium embodying a computer program product for controlling a display of a radar image on board an aircraft, the radar image comprising a weather radar image, wherein the computer program product, when executed by a computer, causes the computer to:
    in response to receiving data associated with a radar echo, automatically perform at least one predetermined test on the data including any one or more of:
       determining whether a speed of a source of the radar echo exceeds a predetermined threshold;
       determining whether a distance between a location of the source of the radar echo and a location of another aircraft exceeds a predetermined threshold; and
       determining whether a dimension corresponding specifically to the source of the radar echo exceeds a predetermined threshold;
    decide whether to display via an image display device a representation of the radar echo; and
    select the representation of the radar echo from a plurality of predetermined representations based on a result of the at least one predetermined test.

13. The computer-readable medium according to claim 12, further comprising instructions that, when executed, causes the computer to:
    control the image display device so that it appears without a representation corresponding to the radar echo.

14. The computer-readable medium according to claim 12, comprising instructions that, when executed, causes the computer to:
    display via the image display device a predetermined symbol representing the radar echo.

15. The computer-readable medium according to claim 12, comprising instructions that, when executed, causes the computer to:
    determine whether at least one zone contiguous with a zone from which the echo comes is associated with another echo.

16. The computer-readable medium according to claim 12, wherein the radar image is displayed, via the image display device, in a first zone from which the radar echo comes, with a representation that results from another echo coming from at least one second zone that is contiguous with the first zone.

* * * * *